United States Patent [19]
Malvar

[11] Patent Number: 6,073,153
[45] Date of Patent: Jun. 6, 2000

[54] FAST SYSTEM AND METHOD FOR COMPUTING MODULATED LAPPED TRANSFORMS

[75] Inventor: Henrique S. Malvar, Redmond, Wash.

[73] Assignee: Microsoft Corporation, Redmond, Wash.

[21] Appl. No.: 09/089,949

[22] Filed: Jun. 3, 1998

[51] Int. Cl.[7] .................................................. G06F 17/14
[52] U.S. Cl. ........................................... 708/400; 708/402
[58] Field of Search ................................. 708/400, 402, 708/409

[56] References Cited

U.S. PATENT DOCUMENTS

| | | | |
|---|---|---|---|
| 5,408,425 | 4/1995 | Hou | 708/402 |
| 5,715,280 | 2/1998 | Sandberg et al. | 375/260 |
| 5,859,788 | 1/1999 | Hou | 708/400 |

OTHER PUBLICATIONS

P. Duhamel, Y. Mahieux, and J.P. Petit, "A Fast Algorithm For The Implementation Of Filter Banks Based On Time Domain Aliasing Cancellation," Proc. IEEE ICASSP, Toronto, Canada, May 14–17, 1991, pp. 2209–2212.

D. Sevic and M. Popovic, "A New Efficient Implementation Of The Oddly Stacked Princen–Bradley Filter Bank," IEEE Signal Processing Letters., vol. 1, No. 11, pp. 166–168, Nov. 1994.

C.W. Kok, "Fast Algorithm For Computing Discrete Cosine Transform," IEEE Trans. Signal Processing, vol. 45, No. 3, pp. 757–760, Mar. 1997.

*Primary Examiner*—David H. Malzahn
*Attorney, Agent, or Firm*—Lyon, Harr & DeFrank; Edmond A. DeFrank

[57] ABSTRACT

The present invention is embodied in a system and method for fast computation of a spatial transform of an input signal. The computation system includes a window processor having a window function and an operator having a first set of weights. The window processor receives the input signal as sample blocks and the operator is adapted to apply butterfly coefficients determined by the window function to produce resulting vectors. Also, the window processor maps the input signal to a cascade of butterflies using the first set of weights and reorders the cascade of butterflies. A transform processor having a transform module computes a spatial transform from the reordered cascade of butterflies to produce transform coefficient. A coefficient combination operator combines the transform coefficients to produce an encoded output corresponding to the input signal.

28 Claims, 8 Drawing Sheets

FAST SYSTEM AND METHOD FOR COMPUTING MODULATED LAPPED TRANSFORMS

BACKGROUND OF THE INVENTION

1. Field of the Invention

The present invention relates to a system and method for computing modulated lapped transforms (MLT's), and in particular, a system and method for computing MLT's by decomposing a MLT into butterfly operators followed by a transform for fast computation of the MLT.

2. Related Art

In many engineering and scientific applications, it is desired to analyze a signal in the frequency domain or represent the signal as a linear superposition of various sinusoids. The analysis of the amplitudes and phases of such sinusoids (the signal spectrum) can be useful for operations such as noise reduction, compression, and pattern recognition, among other things. The Fourier transform is a classical tool used for frequency decomposition of a signal. The Fourier transform breaks a signal down to component frequencies. However, its usefulness is limited to signals that are stationary, i.e., spectral patterns of signals that do not change appreciably with time. Since most real-world signals, such as audio and video signals, are not stationary signals, localized frequency decompositions are used, such as time-frequency transforms. These transforms provide spectral information that is localized in time.

One such transform is the discrete cosine transform (DCT). The DCT breaks a signal down to component frequencies. For instance, a block of M samples of the signal can be mapped to a block of M frequency components via a matrix of M×M coefficients. To ensure a good energy compaction performance, the DCT approximates the eigenvectors of the autocorrelation matrix of typical signal blocks. Basis functions for the DCT (for type II) can be defined as:

$$a_{nk} = c(k)\sqrt{\frac{2}{M}} \cos\left[\left(n + \frac{1}{2}\right)\frac{k\pi}{M}\right]$$

where, $a_{nk}$ is the element of an A transformation matrix in the nth row and kth column, or equivalently, the nth sample of the kth basis function. For orthonormality, the scaling factors are chosen as:

$$c(k) \equiv \begin{cases} 1/\sqrt{2} & \text{if } k = 0 \\ 1 & \text{otherwise} \end{cases}$$

The transform coefficients X(k) are computed from the signal block samples x(n) by:

$$X(k) = \sum_{n=0}^{M-1} a_{nk} x(n)$$

The DCT can be used for convolution and correlation, because it satisfies a modified shift property. Typical uses of the DCT are in transform coding, spectral analysis, and frequency-domain adaptive filtering.

An alternative transform for spectral analysis is the discrete cosine transform, type IV (DCT-IV). The DCT-IV is obtained by shifting the frequencies of the DCT basis functions in eqn. (A) by $\pi/2M$, in the form:

$$a_{nk} = \sqrt{\frac{2}{M}} \cos\left[\left(n + \frac{1}{2}\right)\left(k + \frac{1}{2}\right)\frac{\pi}{M}\right]$$

Unlike the DCT, the scaling factor is identical for all basis functions. It should be noted that the DCT-IV basis functions have a frequency shift, when compared to the DCT basis. Nevertheless, these transforms still lead to orthogonal basis.

The DCT and DCT-IV are useful tools for frequency-domain signal decomposition. However, they suffer from blocking artifacts. In typical applications, the transform coefficients X(k) are processed in some desired way: quantization, filtering, noise reduction, etc. Reconstructed signal blocks are obtained by applying the inverse transform to such modified coefficients. When such reconstructed signal blocks are pasted together to form the reconstructed signal (e.g. a decoded audio or video signal), there will be discontinuities at the block boundaries. The modulated lapped transform (MLT) eliminates such discontinuities by extending the length of the basis functions to twice the block size, i.e. 2M. Their basis functions are obtained by extending the DCT-IV functions and multiplying them by an appropriate window, in the form:

$$a_{nk} = h(n)\cos\left[\left(n + \frac{M+1}{2}\right)\left(k + \frac{1}{2}\right)\frac{\pi}{M}\right]$$

where k varies from 0 to M−1, but n now varies from 0 to 2M−1.

Thus, MLTs are used because they can lead to orthogonal basis and can achieve short-time decomposition of signals as a superposition of overlapping windowed cosine functions. Such functions provide a more efficient tool for localized frequency decomposition of signals than the DCT or DCT-IV. The MLT is a particular form of a cosine-modulated filter bank that allows for perfect reconstruction. For example, a signal can be recovered exactly from its MLT coefficients. Also, the MLT does not have blocking artifacts, namely, the MLT provides a reconstructed signal that decays smoothly to zero at its boundaries, avoiding discontinuities along block boundaries. In addition, the MLT has almost optimal performance for transform coding of a wide variety of signals. Because of these properties, the MLT is being used in many applications, such as many modern audio and video coding systems, including Dolby AC-3, MPEG-2 Layer III, and others.

As such, fast and efficient computation of the MLT is desirable because it can reduce implementation costs of MLT computations. Current MLT computation systems attempt to improve the speed of the MLT computations. Although some current MLT computation systems have reduced multiplications as compared to a "standard" MLT computation system, the number of data memory locations has increased in these systems to achieve faster computations. In other words, reduced multiplicative complexity has lead to the need for additional data storage.

Therefore what is needed is a new MLT computation system that can save multiplications without requiring additional data storage. What is also needed is a MLT computation system that leads to savings in operations for biorthogonal MLT's (those in which different windows are used for the direct and inverse transforms).

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for fast computation of a spatial transform of an input signal.

The computation system includes a direct transform module having a window processor and a transform processor. The window processor has a window function and an operator having a first set of weights. The window processor receives the input signal as sample blocks and the operator is adapted to apply butterfly coefficients determined by the window function to produce resulting vectors. Also, the window processor maps the input signal to a cascade of butterflies using the first set of weights and reorders the cascade of butterflies. The transform processor has a transform module and a coefficient combination operator. The transform module computes a spatial transform from the reordered cascade of butterflies to produce a transform coefficient. The coefficient combination operator combines the transform coefficients to produce an encoded output corresponding to the input signal.

In addition, the computation system can include an inverse transform module for inverse transformation of the encoded output. The inverse transform module includes components that can be the exact inverse of the components of transform module, namely an inverse coefficient combination operator, an inverse transform operator, and an inverse window operator. The encoded output is received and processed by the inverse coefficient combination operator, sent to and processed by the inverse transform operator, and then received and processed by the inverse window operator to produce an output signal that substantially matches the input signal.

Further, the present invention is embodied in Type-I and Type-II systems and methods for more efficiently computing butterfly operators with direct and inverse transforms for biorthogonal modulated lapped transforms and orthogonal modulated lapped transforms with a sine window, respectively. The Type-I and Type-II denomination is specific to MLT transforms, and is not related to the type II and type IV DCTs previously discussed. The Type-I is generally accomplished by scaling the butterfly coefficients and applying the inverse scaling to predefined gains, in such a way to eliminate the need for additional scaling operators. The Type-II is generally accomplished by modifying the butterflies. The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Exemplary Operating Environment

Figure 1:
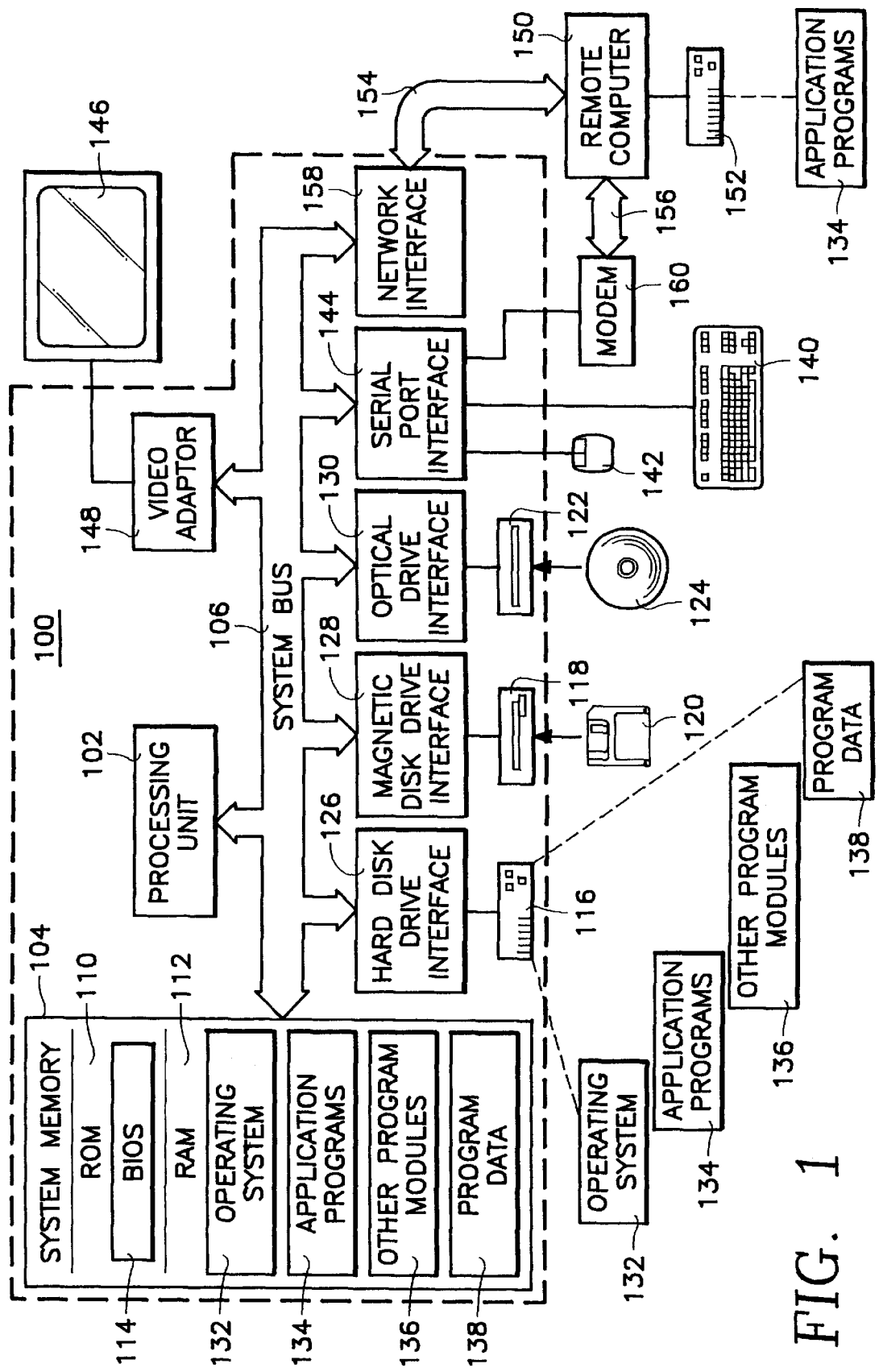
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that helps to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 130, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used.

Figure 2:
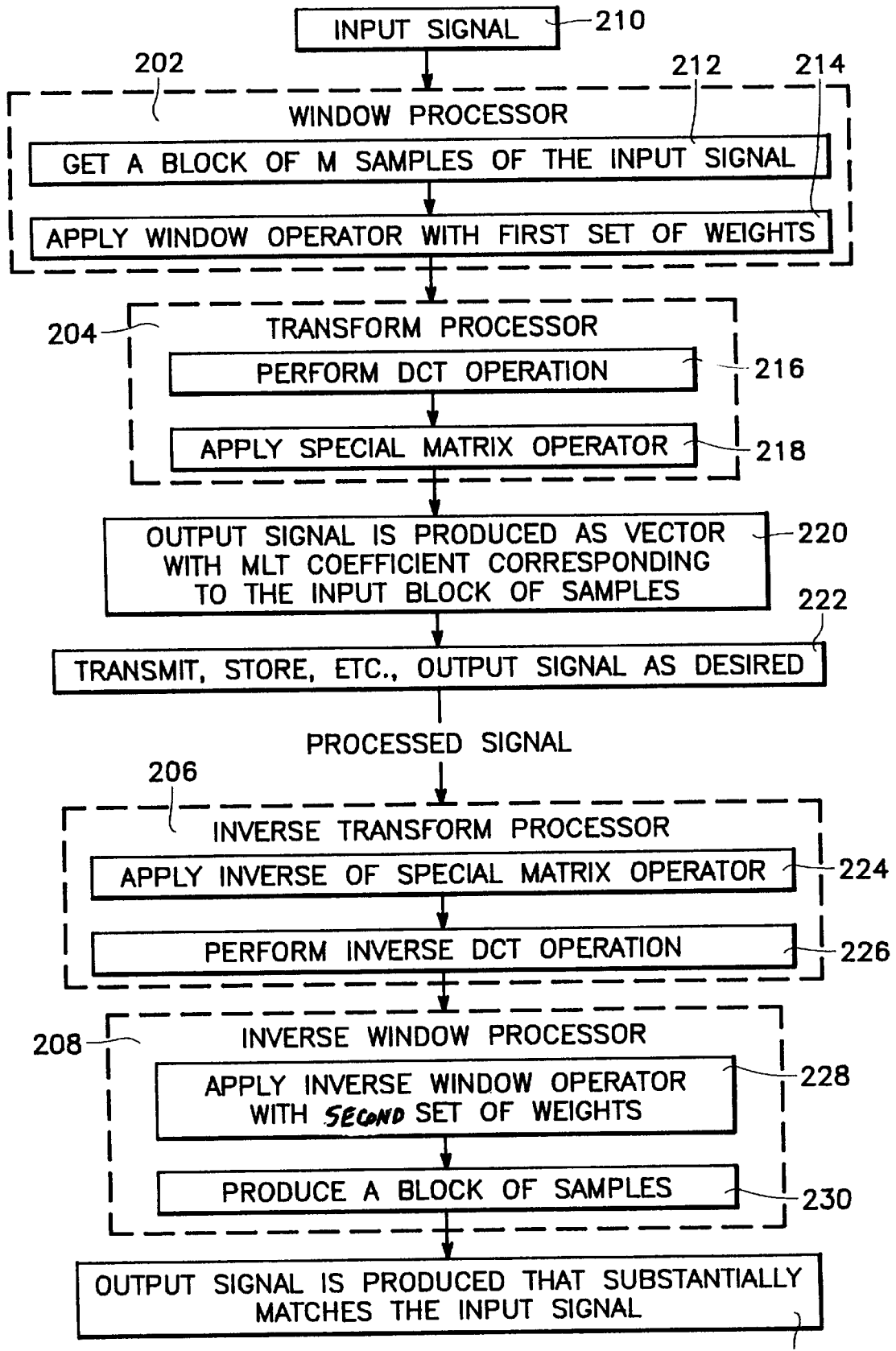
FIG. 2 is a general block/flow diagram illustrating a system and method for computing modulated lapped transforms in accordance with the present invention.

Overview of Components and Operation:

FIG. 2 is a general block/flow diagram illustrating a system and method for computing modulated lapped transforms in accordance with the present invention. The MLT computation system for a direct transform includes a window processor 202 and a transform processor 204. The MLT computation system for an inverse transform includes an inverse transform processor 206 and an inverse window processor 208. The MLT computation system of the present invention saves multiplications without requiring additional data storage. Also, the MLT computation system of the present invention leads to savings in operations for biorthogonal MLT's. In addition, the MLT computation system of the present invention can reach the lower bound on multiplicative complexity for small block sizes (M<64).

The MLT computation system first receives an input signal 210. Second, the window processor 202 receives a block of M samples of the input signal 210 and applies a window operator with a first set of weights 214. Third, the transform processor 204 performs a discrete cosine transform (DCT) operation on the signal 216 and also applies a coefficient combination operator to the signal 218. Fourth, an output signal is produced as a vector with an MLT coefficient corresponding to the input block of samples 220. Fifth, the output signal can be processed by transmitting, storing, enhancing, filtering, etc. the signal 222. For example, interference within the signal can be reduced with a noise reducer, echo canceller, etc., compression can be achieved by scalar or vector quantization of the MLT coefficients, etc., as desired 222. Next, the inverse transform processor 206 receives the processed signal. The inverse transform processor 206 applies an inverse of the coefficient combination operator 224 and performs an inverse DCT operation 226. The inverse window processor 208 then applies an inverse window operator with a second set of weights 228 and produces a block of samples 230. Last, the output signal is produced that substantially matches the input signal 232.

Figure 3A:
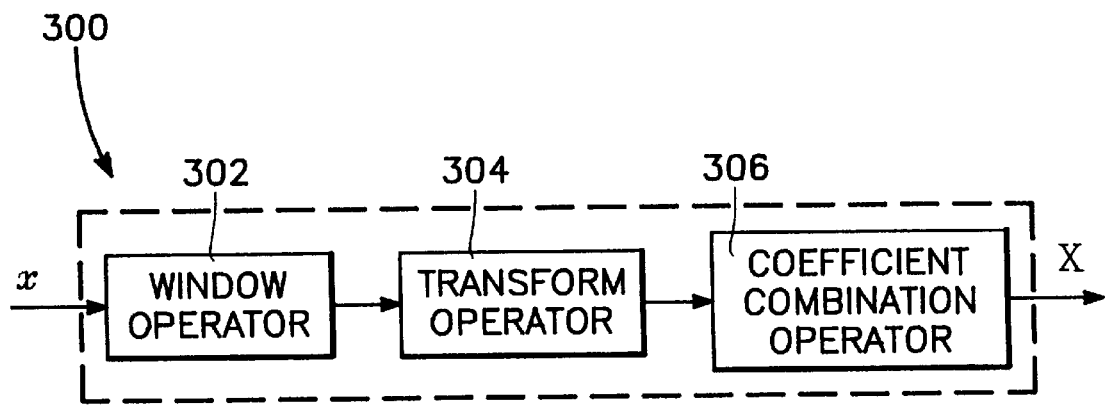
FIG. 3A is a general block diagram illustrating a system for computing and encoding modulated lapped transforms in accordance with the present invention.

FIG. 3A is a general block diagram illustrating a system for computing modulated lapped transforms in accordance with the present invention. Referring to FIG. 2 along with FIG. 3A, the window processor 202 and the transform processor 204 of FIG. 2 can be embodied in an MLT computation system of FIG. 3A for direct transform 300. The MLT computation system 300 includes a window operator 302 for reducing blocking effects, a transform operator 304, such as a discrete cosine transform (DCT) component, for coding each block, and a coefficient combination operator 306 for combining coefficients produced by the window operator and the DCT component. Similar to FIG. 2, the window operator 302 first receives and processes an input signal x. The window operator 302 processes the input signal x with a first set of weights. The DCT component 304 receives the signal processed by the window operator and performs a discrete cosine transform operation on the processed signal. The coefficient combination operator 306 receives the DCT transformed signal and processes it by combining DCT coefficients to produce the MLT coefficients X (discussed in detail below).

Figure 3B:
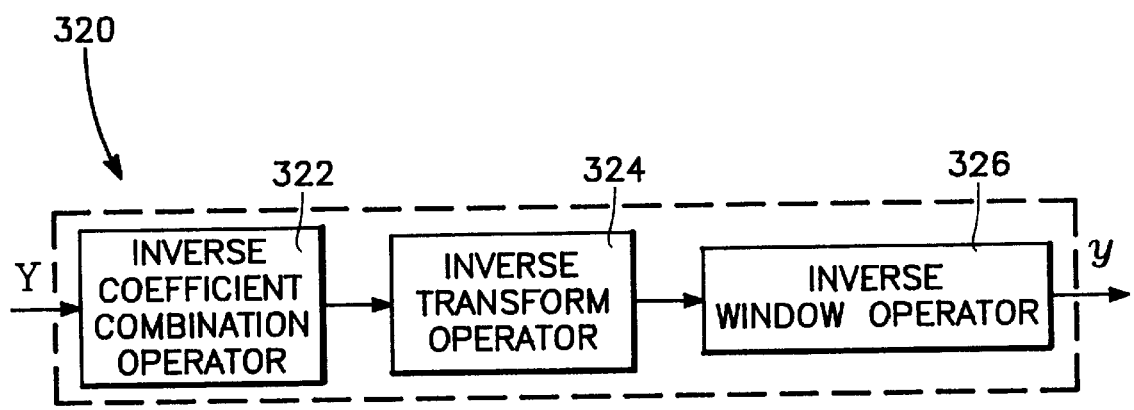
FIG. 3B is a general block diagram illustrating a system for computing and decoding modulated lapped transforms in accordance with the present invention.

FIG. 3B is a general block diagram illustrating a system for computing inverse modulated lapped transforms in accordance with the present invention. Referring to FIG. 2 along with FIG. 3B, the transform processor 206 and the inverse window processor 208 of FIG. 2 can be embodied in an MLT computation system of FIG. 3B for inverse transform 320. The decoded signal Y is set so that Y=X. The signal Y is received and processed by an inverse coefficient combination operator 322, which includes combining MLT coefficients. The processes signal is sent to and processed by an inverse transform operator 324, such as an inverse DCT component, and then received and processed by an inverse window operator 326 with the second set of weights to produce signal y, which substantially matches the input signal x.

The inverse coefficient combination operator 322, inverse DCT component 324, and inverse window operator 326 can be exact inverse components of the coefficient combination operator 306, DCT component 304, and window operator 302, respectively (discussed in detail below). In some applications, e.g., when the transform coefficients are significantly corrupted by noise, better recovery of the signal y can be obtained with the inverse window operator 326 not being exactly the inverse of the window operator 302. For example, optimal estimation techniques could be used, such as Wiener filtering to compute an optimal second set of weights for the inverse transform operator 324, which approximate but are not exactly equal to the inverse of the window operator 302. The MLT computation system for direct and inverse transform 300, 320 provide fast MLT computation with lower computational complexity. Also, as will be discussed below in detail, the computational complexity of the MLT is reduced without added overhead with new MLT computation systems, namely Type-I and Type-II MLT computation systems. As a result, unlike previous MLT computations systems, the MLT computation system of the present invention provides computational savings without requiring additional data storage.

Component Details:

The basic MLT is an efficient tool for localized frequency decomposition of signals. The MLT is based on the oddly-stacked time-domain aliasing cancellation (TDAC) filter bank. In general, the standard MLT transformation for a vector containing 2M samples of an input signal x(n), n=0, 1, 2, . . . , 2M−1 (which are determined by shifting in the latest M samples of the input signal, and combining them with the previously acquired M samples), is transformed into another vector containing M coefficients X(k), k=0, 1, 2, . . . , M−1. The transformation can be redefined by a standard MLT computation:

$$X(k) \equiv \sqrt{\frac{2}{M}} \sum_{n=0}^{2M-1} x(n)h(n)\cos\left[\left(n + \frac{M+1}{2}\right)\left(k + \frac{1}{2}\right)\frac{\pi}{M}\right]$$

where h(n) is the MLT window. A simple loop evaluating the standard MLT computation requires multiplication and addition of 2M numbers for each one of the M transform coefficients. Therefore, it would take $2M^2$ multiplications and $2M^2 - M$ additions. The MLT computation system of the present invention improves these numbers without increasing the number of data memory locations to achieve faster computations. This is in contrast to other MLT computation systems where reduced multiplicative complexity leads to the need for additional data storage or an increase in the number of data memory locations to achieve faster computations.

Figure 4A:
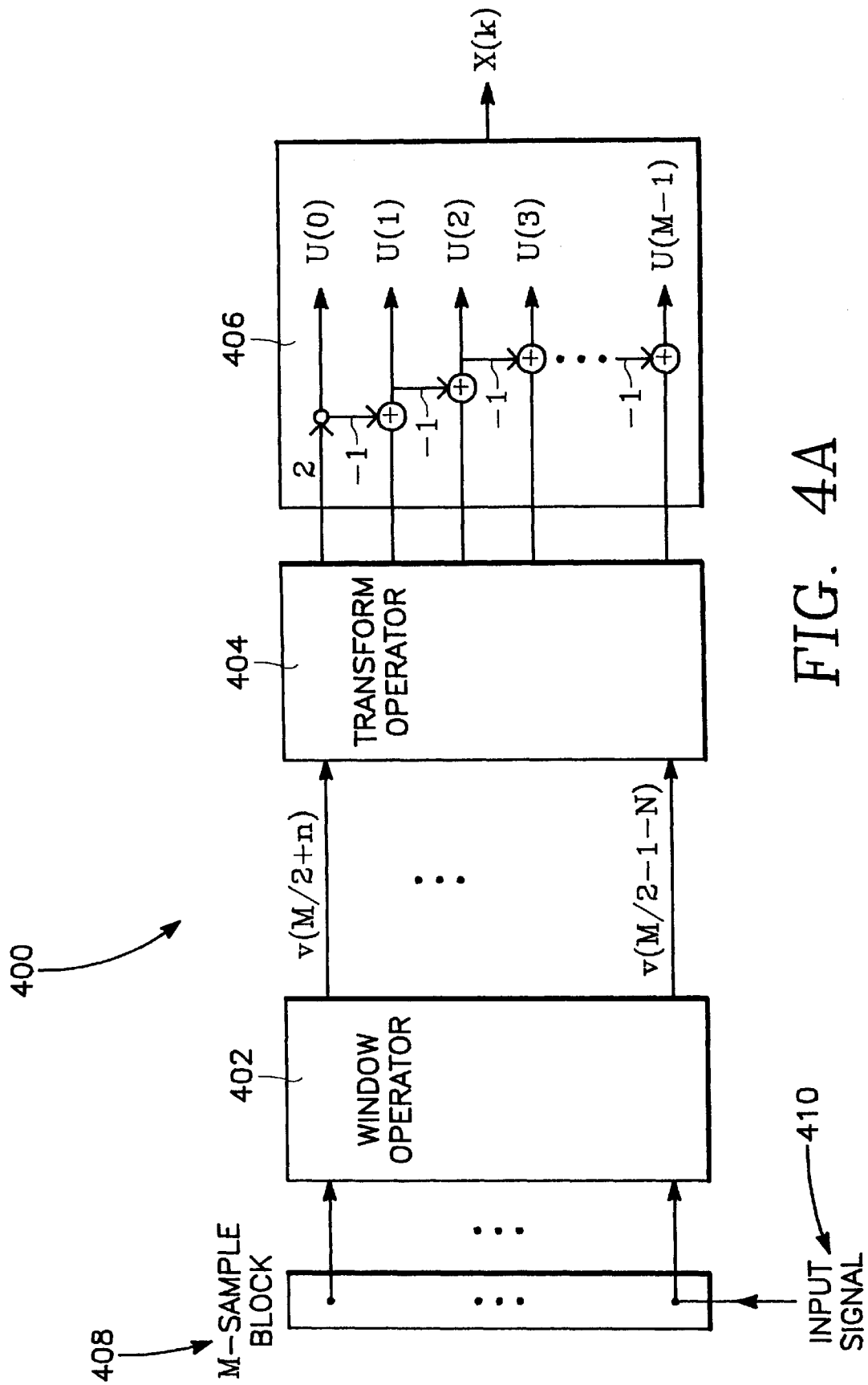
FIGS. 4A and 4B are block diagrams illustrating a system and method for computing and encoding modulated lapped transforms in accordance with the present invention.
Figure 4B:
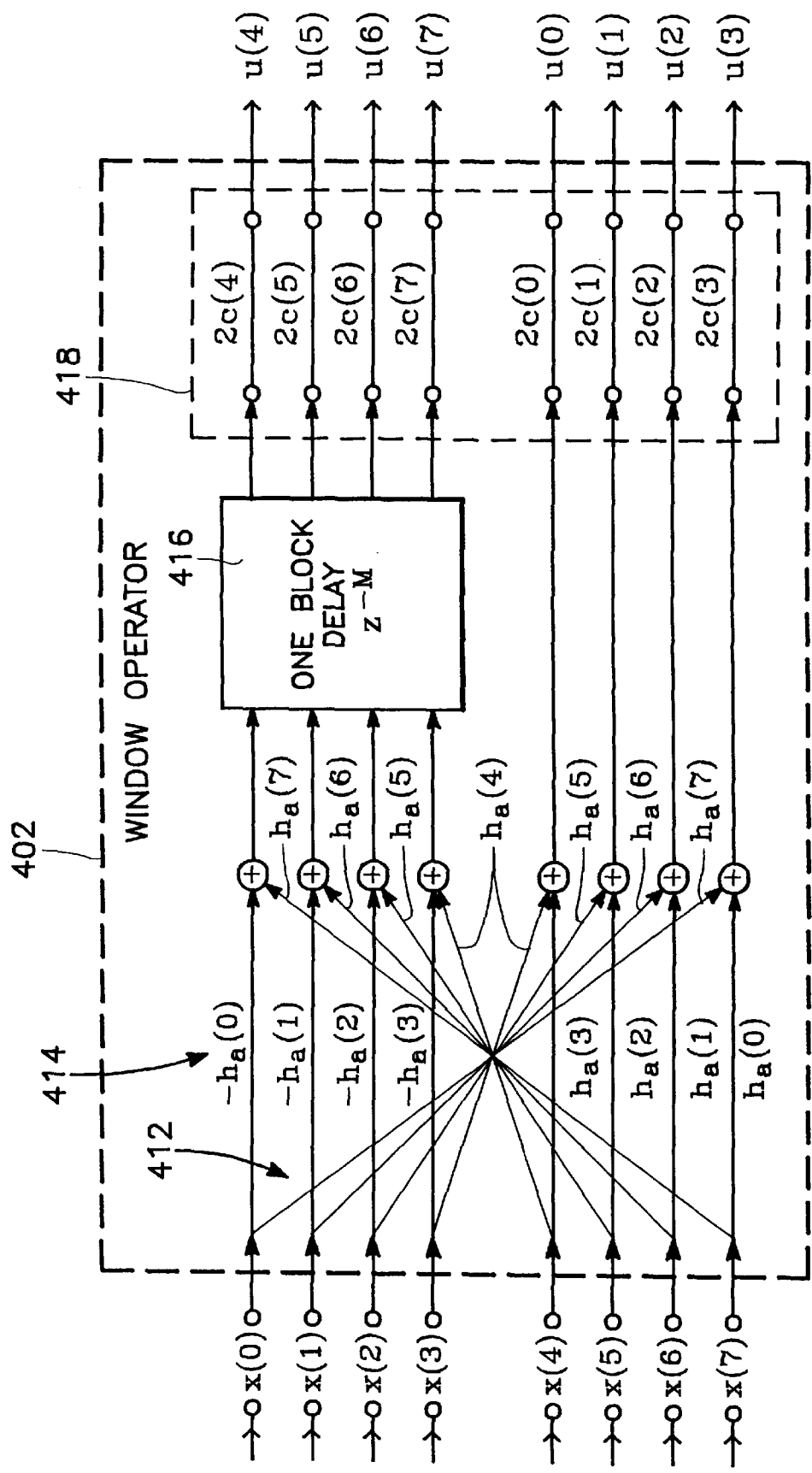
Figure 4C:
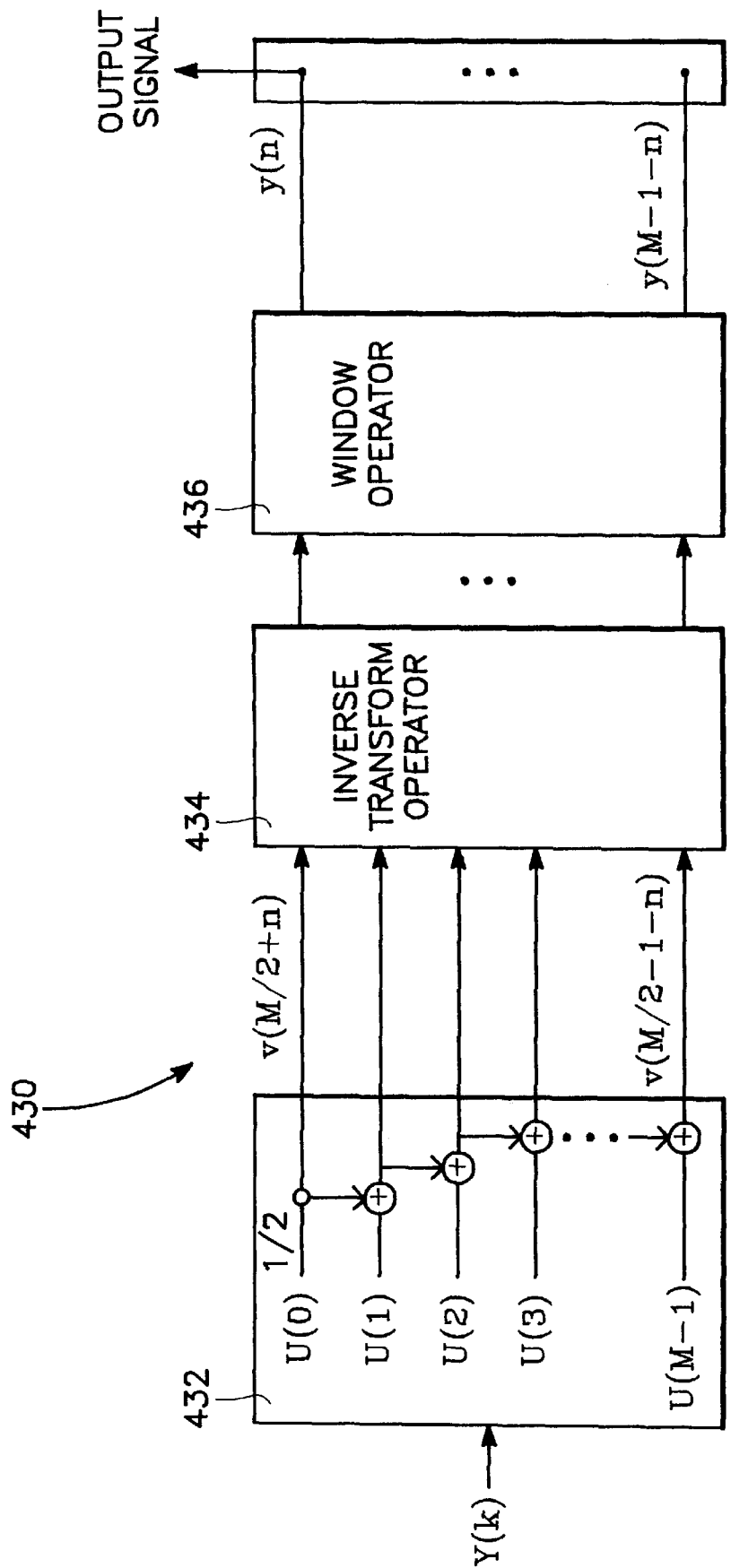
FIG. 4C is a block diagram illustrating a system and method for computing and decoding modulated lapped transforms in accordance with the present invention.

The present invention reduces the computational complexity of the standard and existing MLT computation systems. FIGS. 4A and 4B are block diagrams illustrating a system and method for computing modulated lapped transforms in accordance with the present invention. FIG. 4C is a block diagram illustrating a system and method for computing inverse modulated lapped transforms in accordance with the present invention.

In general, as shown in FIGS. 4A and 4B, a direct transform processor 400 includes a window operator 402, a transform operator 404 and a coefficient combination operator 406. A first a block of M samples 408 of an input signal x(n) 410 is obtained. Second, the window operator 402 is applied with butterfly coefficients 412 determined by a window function {h(n)} 414 (for M=8, the butterfly coefficients are shown in detail in FIG. 4B). Half of the resulting vectors are stored in a buffer of a one block delay 416 to be used for the next block, while the current contents of the buffer are recovered. Next, an operator matrix 418, such as a diagonal matrix C maps the input signal x(n) to v(n), a cascade of butterflies (for M=8, the cascade of butterflies are shown in detail in FIG. 4B). The butterflies are reordered and a transform is computed with the transform operator 404, which is preferably a discrete cosine transform (DCT). The coefficient combination operator 406 combines the coefficients to produce an X(k) output. The output of the coefficient combination operator 406 is a vector with the MLT transform coefficients corresponding to the input signal 410.

As shown in FIG. 4C, an inverse transform module 430 is shown having an inverse coefficient combination operator 432, an inverse transform operator 434, and an inverse window operator 436. Theses inverse components 432, 434, 436 are inverse components of the coefficient combination operator 406, transform operator 404, and window operator 402, respectively, of FIGS. 4A and 4B. The encoded signal X of FIGS. 4A and 4B are set so that X=Y. The signal Y is received and processed by the inverse coefficient combination operator 432 and sent to and processed by the inverse transform operator 434 and then received and processed by the inverse window operator 436 to produce signal y, which substantially matches the input signal x.

Window functions are primarily employed for reducing blocking effects. For example, *Signal Processing with Lapped Transforms,* by H. S. Malvar, Boston: Artech House, 1992, which is herein incorporated by reference, demonstrates obtaining its basis functions by cosine modulation of smooth window operators, in the form:

$$p_a(n, k) = h_a(n)\sqrt{\frac{2}{M}} \cos\left[\left(n + \frac{M+1}{2}\right)\left(k + \frac{1}{2}\right)\frac{\pi}{M}\right] \quad (1)$$

$$p_s(n, k) = h_s(n)\sqrt{\frac{2}{M}} \cos\left[\left(n + \frac{M+1}{2}\right)\left(k + \frac{1}{2}\right)\frac{\pi}{M}\right]$$

where $p_a(n,k)$ and $p_s(n,k)$ are the basis functions for the direct (analysis) and inverse (synthesis) transforms, and $h_a(n)$ and $h_s(n)$ are the analysis and synthesis windows, respectively. The time index n varies from 0 to 2M−1 and the frequency index k varies from 0 to M−, where M is the block size. The MLT is the TDAC for which the windows generate a lapped transform with maximum DC concentration, that is:

$$h_a(n) = h_s(n) = \sin\left[\left(n + \frac{1}{2}\right)\frac{\pi}{2M}\right] \quad (2)$$

The direct transform matrix $P_a$ has an entry in the n-th row and k-th column of $p_a(n,k)$. Similarly, the inverse transform matrix $P_s$ has entries $p_s(n,k)$. For a block x of 2M input samples of a signal x(n), its corresponding vector X of transform coefficients is computed by $X=P_a^T x$. For a vector Y of processed transform coefficients, the reconstructed 2M-sample vector y is given by $y=P_s Y$. Reconstructed y vectors are superimposed with M-sample overlap, generating the reconstructed signal y(n).

The MLT can be compared with the DCT-IV. For a signal u(n), its length-M orthogonal DCT-IV is defined by:

$$U(k) \equiv \sqrt{\frac{2}{M}} \sum_{n=0}^{M-1} u(n)\cos\left[\left(n+\frac{1}{2}\right)\left(k+\frac{1}{2}\right)\frac{\pi}{M}\right] \quad (3)$$

The frequencies of the cosine functions that form the DCT-IV basis are $(k+\frac{1}{2})\pi/M$, the same as those of the MLT. Therefore, a simple relationship between the two transforms exists. For instance, for a signal x(n) with MLT coefficients X(k), it can be shown that X(k)=U(k) if u(n) is related to x(n), for n=0, 1, . . . , M/2−1, by:

$$u(n+M/2)=\Delta_M\{x(M-1-n)h_a(M-1-n)-x(n)h_a(n)\}$$

$$u(M/2-1-n)=x(M-1-n)h_a(n)+x(n)h_a(M-1-n)$$

where $\Delta_M\{\bullet\}$ is the M-sample (one block) delay operator. For illustrative purposes, by combining a DCT-IV with the above, the MLT can be computed from a standard DCT-IV. An inverse MLT can be obtained in a similar way. For example, if Y(k)=X(k), i.e., without any modification of the transform coefficients (or subband signals), then cascading the direct and inverse MLT processed signals leads to y(n)=x(n−2M), where M samples of delay come from the blocking operators and another M samples come from the internal overlapping operators of the MLT (the $z^{-M}$ operators).

The above does not assume the MLT s in e window in eqn (2). They lead to perfect reconstruction as long as the butterflies in the inverse transform are the inverses of those in the direct transform. That is true if:

$$h_a(n) = \frac{h_s(n)}{h_s^2(n) + h_s^2(M-1-n)}$$

This window function is preferably used to compute the biorthogonal MLT (other suitable window functions exist) in which the synthesis window $h_s(n)$ has a particular form that not only improves the stopband attenuation of the synthesis filters in, but is also appropriate for the generation of multiresolution MLT's. This window function forms the basis for the window operator 404 as shown in FIG. 4A.

The biorthogonal modulated lapped transform (or referred to as the modulated lapped biorthogonal transform [MLBT]) is a variant of the modulated lapped transform (MLT). Like the MLT, the MLBT window length is twice the block size, it leads to maximum coding gain, but its shape is slightly modified with respect to the original MLT sine window. To generate biorthogonal MLTs within the formulation in Eqn. (1), the constraint of identical analysis and synthesis windows need to be relaxed. Assuming a symmetrical synthesis window, and applying biorthogonality conditions to Eqn. (1), Eqn. (1) generates a modulated lapped biorthogonal transform (MLBT) if the analysis window satisfies generalized conditions.

The windows can be optimized for maximum transform coding gain with the result that the optimal windows converge to the MLT window of Eqn. (2). This allows the MBLT to improve the frequency selectivity of the synthesis basis functions responses. The main difference between the MLBT and the MLT is that the MLBT has an increase of the stopband attenuation of the synthesis functions, at the expense of a reduction in the stopband attenuation of the analysis functions.

If the above window function is used with a DCT-IV, the computational complexity of the MLT computation is that of the DCT-IV plus the calculation of M/2 butterflies. For an orthogonal MLT, i.e. for $h_a(n)=h_s(n)$, each butterfly can be computed with three multiplications and three additions. Thus, to evaluate a direct and an inverse MLT, two DCT-IV's plus 3M multiplications and 3M additions need to be computed. Further, M additional memory locations (to store half a block in each the direct and inverse MLT's) is needed.

Thus, as shown in FIG. 4A, the computational complexity of the above standard MLT can be reduced by forming a new MLT computation system comprising the window operator 402, transform operator 404, and coefficient combination operator 406 of FIG. 4A. The window operator includes the window function described above combined with an operator matrix defined by a first set of weights (described below). The window operator 402 as shown in FIG. 4A of the present invention, has an n-dimensional sequence that is symmetrical in each of the n-dimensions. For a sample value in a block, the sum of the window operator is a predetermined value. The window operators for that sample value in all blocks adjacent to that block are also a predetermined value. In addition, the rate of change of the window operator in each dimension may be relatively smooth near block boundaries. A reduction of the computational complexity is discussed below in detail.

With regard to the DCT component 404 and the coefficient combination operator 414, for the DCT-IV above, U(k) in satisfies $$U(k)+U(k-1)=V(k), \text{ for k>0}$$

$$U(0)=2V(0) \quad (4)$$

where $$V(k) \equiv \sqrt{\frac{2}{M}} \sum_{n=0}^{M-1} v(n)\cos\left[\left(n+\frac{1}{2}\right)\frac{k\pi}{M}\right]$$

which is the DCT component of the present invention (with a √2 scaling factor for the DC coefficient) of the sequence v(n), given by:

$$v(n) = 2x(n)c(n), \; c(n) \equiv \cos\left[\left(n+\frac{1}{2}\right)\frac{\pi}{2M}\right] \quad (5)$$

As shown in FIG. 4B, the operator matrix 418, is preferably a diagonal matrix C, having its entries equal to c(n). Also, referring to FIG. 4A, the coefficient combination operator, which can be an operator matrix B, corresponds to the mapping U(k)=V(k)−U(k−1). With this arrangement, mapping from x(n) to v(n) becomes a cascade of butterflies with the diagonal matrix C. Similarly, the transpose of FIG. 4B, is used to obtain the inverse MLT computation, as shown in FIG. 4C. The fast MLT computation is based on a length-M DCT. The operator B is defined as shown in FIG. 4A and in eqn (6).

Figure 5A:
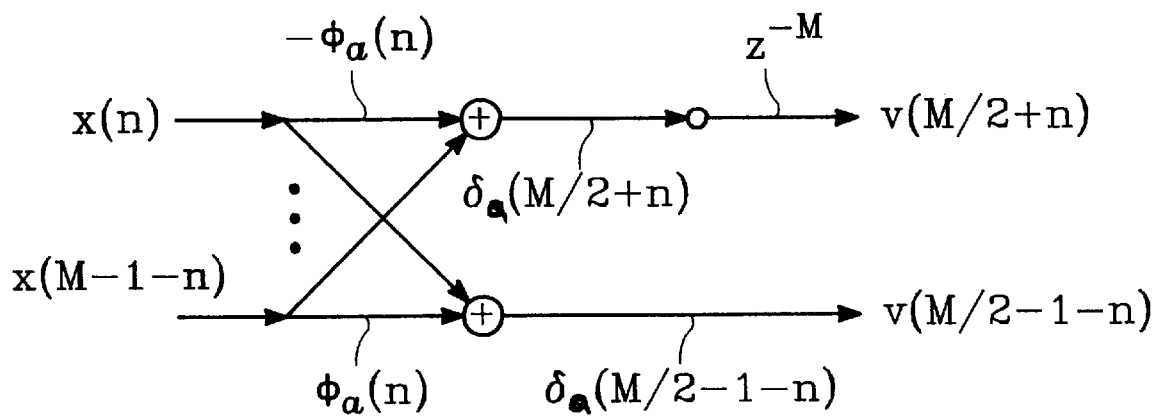
FIGS. 5A and 5B are block diagrams illustrating a detailed view of a first modified window operator of FIGS. 4A and 4B and inverse window operator of FIG. 4C, for computing modulated lapped transforms in accordance with the present invention.
Figure 5B:
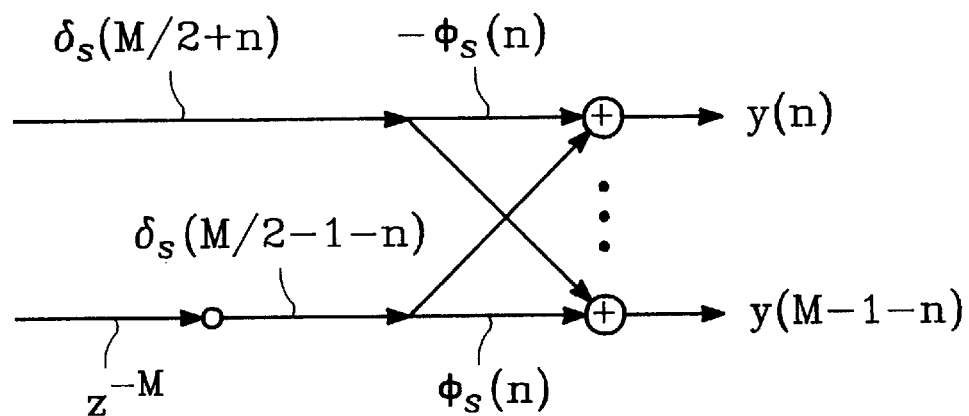
Figure 6A:
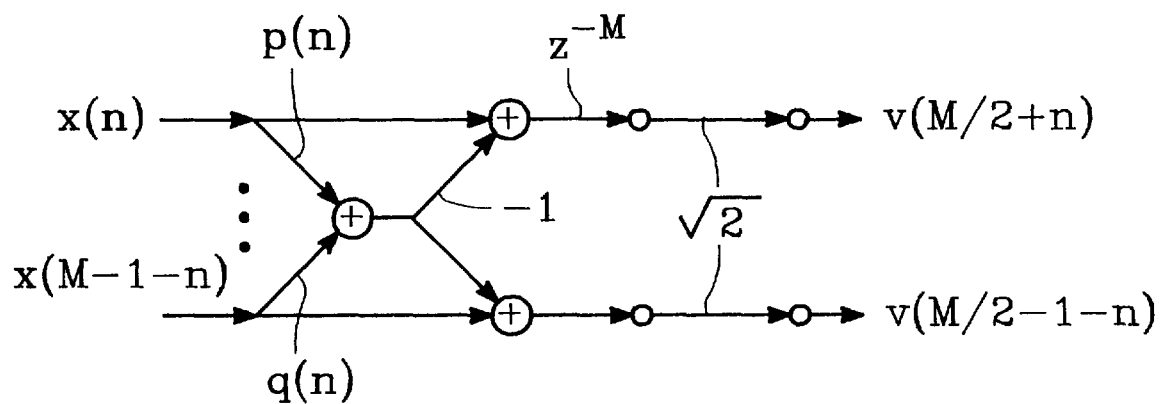
FIGS. 6A and 6B are block diagrams illustrating a detailed view of a second modified window operator of FIGS. 4A and 4B and inverse window operator of FIG. 4C for computing modulated lapped transforms in accordance with the present invention.
Figure 6B:
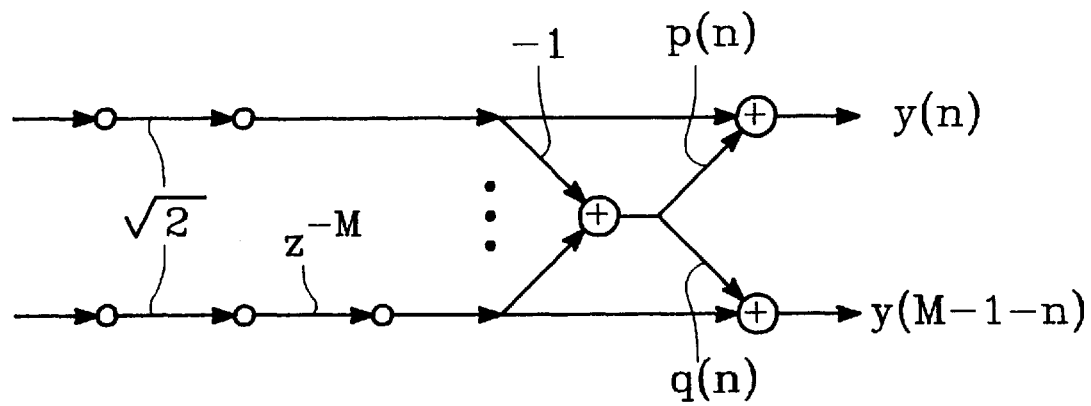

Type-I and Type-II MLT Computations:

FIGS. 5A and 5B are block diagrams illustrating a detailed view of a first modified window operator of FIGS. 4A and 4B and inverse window operator of FIG. 4C, for computing modulated lapped transforms in accordance with the present invention. FIGS. 6A and 6B are block diagrams illustrating a detailed view of a second modified window operator of FIGS. 4A and 4B and inverse window operator of FIG. 4C for computing modulated lapped transforms in accordance with the present invention.

The computational complexity of the above MLT computation can be further reduced. Namely, the butterfly operators of the window operator of FIG. 4B can be efficiently computed with the structures shown in FIGS. 5A (direct transform) and 5B (inverse transform) for biorthogonal MLT's, or the structures shown in FIGS. 6A (direct transform) and 6B (inverse transform) for the orthogonal MLT with the sine window. These butterflies define Type-I and Type-II fast MLT computations, respectively, of the present invention.

In general, the Type-I fast MLT computation of the present invention matches the computational complexity of existing MLT computation systems without being restricted to the sine window of eqn. (2). For that window, the Type-II MLT of the present invention reduces the total operation count by M. With this, it can be seen that the multiplicative complexity of the MLT with the sine window of eqn. (2) is the same as that of the DCT-IV. This means that it is not possible to reduce the multiplicative complexity even further than the Type-II MLT computation of the present invention without the added cost of an excessive number of additions.

Specifically, with regard to the Type-I computation, the computational complexity of the fast MLT can be reduced by scaling the butterfly coefficients, and applying the inverse scaling to the c(n) gains. This is accomplished by replacing the butterfly operators of the window operator of FIG. 4A with the butterfly structures of FIGS. 5A (direct transform) and 5B (inverse transform). This creates reordering of the window operators to get new coefficients, where:

$$\phi_a(n)=h_a(n)/h_a(M-1-n), \phi_s(n)=h_s(n)/h_s(M-1-n)$$

$$\delta_a(n)=2c(n)h_a(M/2+n), \delta_s(n)=2c(n)h_s(M/2+n)$$

$$\delta_a(M/2+n)=2c(M/2+n)h_a(M-1-n) \quad (6)$$

$$\delta_s(M/2+n)=2c(M/2+n)h_s(M-1-n)$$

For most window designs, $\frac{1}{2} < h_a(n), h_s(n) < 2$ for $M/2 \leq n < M$. Therefore, the divisions in eqn. (6) do not to significantly increase the dynamic ranges of $\phi_a(n)$ and $\phi_s(n)$, where $\phi$ and $\delta$ are the new coefficients.

Thus, with the modified butterflies of FIGS. 5A (direct transform) and 5B (inverse transform), the computation of one butterfly, which needs three multiplications and three additions, and two additional multiplications is replaced by a modified butterfly that takes four multiplications and two additions. Thus, one multiplication and one addition per butterfly stage is saved. For the computation of a direct and an inverse MLT, a total of M multiplications and M additions is saved.

With regard to the Type-II computation, additional savings in computations for the case of an orthogonal MLT can be obtained with new windows, as defined in FIGS. 6A (direct transform) and 6B (inverse transform), respectively. Comparing eqn. (2) with eqn. (5) it can be seen that all butterfly gains in are sines or cosines of the same angles. The butterfly operators of the window operator of FIG. 4A can be replaced with the butterfly structures of FIG. 6A for a direct transform and FIG. 6B for an inverse transform so that:

$$p(n)=c(n)[h(n)+c(n)], q(n)=c(n)[h(n)-c(n)]$$

$$n=0, 1, \ldots, M/2-1. \quad (7)$$

It should be noted that the multiplications by $2^{1/2}$ in FIGS. 6A and 6B are just a constant scaling factor for all coefficients. If the DCT component is implemented via a fast Fourier cosine transform (FFCT), for example, the factors can be absorbed in output rotation butterflies. Also, scaled coefficients could be used, and the factors could be replaced at both the direct and inverse transforms by factors of two (essentially mere shifts) at the inverse transform only, for example. In addition, for coding applications the scaling factors can be embedded in quantization step sizes.

The Type-II fast MLT replaces the computation of one butterfly and two additional multiplications by a modified butterfly that needs only two multiplications and three additions. The computational complexity of the Type-II fast MLT, for either the direct or inverse transform, is that of the DCT plus M multiplications and 5M/2−1 additions, for a total of $(M/2)\log_2 M+M$ multiplications and $(3M/2)\log_2 M+3M$ additions. This is equivalent to the computation of a DCT-IV and 3M extra additions.

Results:

A comparison of the computational complexity of various MLT computations is shown in Table 1, in terms of overhead (memory, multiplications, etc.) with respect to the computation of two DCT-IV's. For the sine window of eqn. (2), which is nearly optimal for most coding applications, the Type-II fast MLT of the present invention saves M multiplications and M memory locations over some existing MLT computational systems. For the biorthogonal MLT, with its more flexible window choices, the Type-I fast MLT computation of the present invention saves M multiplications and M additions locations over some existing MLT computational systems.

TABLE 1

| Computation | Extra multiplications | Extra additions | Extra memory locations | Window choice |
| --- | --- | --- | --- | --- |
| Standard MLT Comp. | 3 M | 3 M | M | Any |
| Type-I of Present Invention | 2 M | 2 M | M | Any |
| One MLT Computation | 2 M | 3 M | 1.5 M | Eqn. (2) only |
| Another MLT Computation | M | 3 M | 2 M | Eqn. (2) only |
| Type-II of Present Invention | 0 | 3 M | M | Eqn. (2) only |

*Computational complexity of selected MLT computations for direct and inverse transforms.
Number of multiplications is in addition to those required to compute two DCT-IVs.

Table 2 illustrates the total computation and memory resources needed by the various MLT computation systems for M=32. As shown in Table 2, the Type-II MLT computation of the present invention saves 30% in multiplications when compared to the standard MLT computation and 12% in multiplications and 25% in memory size when compared to a second MLT computation system.

| Computation | Multiplications | Additions | Memory locations | Window choice |
| --- | --- | --- | --- | --- |
| DCT-IV | 224 | 480 | 64 | — |
| Standard MLT Comp. | 320 | 576 | 96 | Any |
| Type-I of Present Invention | 288 | 544 | 96 | Any |
| 1. MLT Computation System | 288 | 576 | 112 | Only |
| 2. MLT Computation System | 256 | 576 | 128 | Only |

-continued

| Computation | Multiplications | Additions | Memory locations | Window choice |
|---|---|---|---|---|
| Type-II of Present Invention | 224 | 576 | 96 | Only |

*Computational complexity of selected MLT computations for direct and inverse transforms M = 32.

Therefore, the MLT computation system of the present invention provides fast MLT computation with lower computational complexity than previous MLT computations systems. As a result, unlike previous MLT computations systems, the MLT computation system of the present invention provides computational savings without requiring additional data storage.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for efficiently computing a biorthogonal modulated lapped transform, said method comprising:
   receiving a first sample and a second sample;
   multiplying the first and second samples by a first pre-computed set of ratios of window coefficients to produce respective first and second multiplied outputs;
   combining the first and second samples with the first and second multiplied outputs to produce respective first and second combined outputs;
   multiplying the first and second combined outputs by a second pre-computed set of ratios of window coefficients to produce respective third and fourth multiplied outputs;
   delaying the third multiplied output and allowing the fourth multiplied output to be undelayed; and
   producing resulting vectors from the delayed third multiplied output and the undelayed fourth multiplied output, wherein the resulting vectors represent a windowed signal.

2. The method of claim 1, wherein the third multiplied output is delayed by storing the third multiplied output in a memory of a one block delay buffer.

3. The method of claim 2, wherein the first sample comprises a first discrete set of samples of an input signal and the second sample comprises a second discrete set of samples of the input signal.

4. The method of claim 3, wherein the number of samples of the first discrete set of samples equals the number of samples of the second discrete set of samples.

5. The method of claim 4, wherein half of the resulting vectors are stored in the memory of the one block delay buffer and current contents of the delay buffer are recovered.

6. The method of claim 1, further comprising computing a spatial transform from the resulting vectors to produce transform coefficients and combining the transform coefficients to produce an encoded output corresponding to the input signal.

7. A fast computation system stored on computer readable memory of a computer system for efficiently computing a biorthogonal modulated lapped transform, the fast computation system comprising:

a window module for applying butterfly coefficients determined by a given window function for replacing first and second samples having values with a linear combination of the values of the samples, the window module comprising,
   a first multiplication submodule for multiplying the first and second samples by a first pre-computed set of ratios of window coefficients to produce respective first and second multiplied outputs,
   a combination module for combining the first and second samples with the first and second multiplied outputs to produce respective first and second combined outputs, and
   a second multiplication submodule for multiplying the first and second combined outputs by a second pre-computed set of ratios of window coefficients to produce respective third and fourth multiplied outputs; and
a delay module for delaying the third multiplied output and allowing the fourth multiplied output to be undelayed and producing resulting vectors from the delayed and undelayed samples, wherein the resulting vectors represent a windowed signal.

8. The fast computation system of claim 7, wherein the delay module comprises a storage submodule for storing the third multiplied output in a memory of a one block delay buffer.

9. The fast computation system of claim 8, wherein the first sample comprises a first discrete set of samples of an input signal and the second sample comprises a second discrete set of samples of the input signal.

10. The fast computation system of claim 9, where in the number of samples of the first discrete set of samples equals the number of samples of the second discrete set of samples.

11. The fast computation system of claim 10, wherein the storage submodule is adapted for storing half of the resulting vectors in the memory of the one block delay buffer and recovering current contents of the delay buffer.

12. The fast computation system of claim 7, further comprising a transform module for computing a spatial transform from the resulting vectors to produce transform coefficients and coefficient operator for combining the transform coefficients to produce an encoded output corresponding to the input signal.

13. A computer-implemented method for efficiently computing an inverse biorthogonal modulated lapped transform, said method comprising:
   receiving a first sample and a second sample representing decoded and inverse transformed data of an original input signal;
   delaying the second sample and allowing the first sample to be undelayed;
   multiplying the first undelayed sample and the second delayed sample by a first pre-computed set of ratios of window coefficients to produce respective first and second multiplied outputs;
   multiplying the first and second multiplied outputs by a second pre-computed set of ratios of window coefficients to produce respective third and fourth multiplied outputs; and
   combining the third and fourth multiplied outputs to produce respective first and second combined outputs corresponding to a reconstructed version of the input signal.

14. The method of claim 13, wherein the second sample is delayed by storing the second sample in a memory of a one block delay buffer.

15. The method of claim 14, wherein the first sample comprises a first discrete set of samples of the input signal and the second sample comprises a second discrete set of samples of the input signal.

16. The method of claim 15, wherein the number of samples of the first discrete set of samples equals the number of samples of the second discrete set of samples.

17. The method of claim 16, wherein half of the resulting vectors are stored in the memory of the one block delay buffer and current contents of the delay buffer are recovered.

18. A computer-implemented method for efficiently computing an orthogonal modulated lapped transform with a predefined sine window, said method comprising:

multiplying a first sample by a first pre-computed ratio of window coefficients to produce a first multiplied output and multiplying a second sample by a second pre-computed ratio of window coefficients to produce a second multiplied output;

combining the first and second multiplied outputs to produce a first combined output, applying a first value to the first combined output to produce a first applied output, and applying a second value to the second combined output to produce a second applied output;

combining the first applied output with the first sample to produce a second combined output and combining the second applied output with the second sample to produce a third combined output;

delaying the second combined output and allowing the third combined output to be undelayed and applying a third value to the delayed second combined output and the third combined output; and producing respective resulting vectors from the delayed and undelayed outputs, wherein the resulting vectors represent a windowed signal.

19. The method of claim 18, wherein the second combined output is delayed by storing the second combined output in a memory of a one block delay buffer.

20. The method of claim 19, wherein the first sample comprises a first discrete set of samples of an input signal and the second sample comprises a second discrete set of samples of the input signal.

21. The method of claim 20, wherein the number of samples of the first discrete set of samples equals the number of samples of the second discrete set of samples.

22. The method of claim 21, wherein half of the resulting vectors are stored in the memory of the one block delay buffer and current contents of the delay buffer are recovered.

23. The method of claim 18, further comprising computing a spatial transform from the resulting vectors to produce transform coefficients and combining the transform coefficients to produce an encoded output corresponding to the input signal.

24. A computer-implemented method for efficiently computing an inverse biorthogonal modulated lapped transform, said method comprising:

receiving a first sample and a second sample representing decoded and inverse transformed data of an original input signal and applying a first value to the first and second samples to produce respective first and second applied outputs;

delaying the second applied output and allowing the first applied output to be undelayed;

applying a second value to the first applied output to produce a third applied output, and applying a third value to the second applied output to produce a fourth applied output and combining the third and fourth applied outputs to produce a first combined output;

multiplying the first combined output by a first pre-computed ratio of window coefficients to produce a first multiplied output and multiplying the first combined output by a second pre-computed ratio of window coefficients to produce a second multiplied output;

combining the first and second multiplied outputs with the first applied output and the second delayed applied output to produce respective second and third combined outputs corresponding to a reconstructed version of the input signal.

25. The method of claim 24, wherein the second applied output is delayed by storing the second sample in a memory of a one block delay buffer.

26. The method of claim 25, wherein the first sample comprises a first discrete set of samples of the input signal and the second sample comprises a second discrete set of samples of the input signal.

27. The method of claim 26, wherein the number of samples of the first discrete set of samples equals the number of samples of the second discrete set of samples.

28. The method of claim 27, wherein half of the resulting vectors are stored in the memory of the one block delay buffer and current contents of the delay buffer are recovered.

\* \* \* \* \*